United States Patent
Hahn (10) Patent No.: US 10,699,543 B2
(45) Date of Patent: Jun. 30, 2020

(54) METHOD FOR OPERATING A SELF-PROPELLED CLEANING DEVICE

(71) Applicant: Vorwerk & Co. Interholding GmbH, Wuppertal (DE)

(72) Inventor: Pia Hahn, Schwelm (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 323 days.

(21) Appl. No.: 15/573,208

(22) PCT Filed: May 10, 2016

(86) PCT No.: PCT/EP2016/060367
§ 371 (c)(1),
(2) Date: Nov. 10, 2017

(87) PCT Pub. No.: WO2016/180796
PCT Pub. Date: Nov. 17, 2016

(65) Prior Publication Data
US 2018/0137728 A1    May 17, 2018

(30) Foreign Application Priority Data
May 13, 2015   (DE) .................. 10 2015 107 598

(51) Int. Cl.
*G08B 13/196*   (2006.01)
*G05D 1/02*    (2020.01)
(Continued)

(52) U.S. Cl.
CPC ..... *G08B 13/19697* (2013.01); *G05D 1/0274* (2013.01); *G08B 3/10* (2013.01);
(Continued)

(58) Field of Classification Search
CPC combination set(s) only.
See application file for complete search history.

(56) References Cited

U.S. PATENT DOCUMENTS

| 7,047,108 B1 * | 5/2006 | Rainier | G08B 13/194 318/800 |
| 2005/0273226 A1 * | 12/2005 | Tani | G01C 21/00 701/23 |

(Continued)

FOREIGN PATENT DOCUMENTS

| DE | 102015113035 A1 * | 2/2017 | ........ G08B 17/103 |
| EP | 2 423 893 A1 | 2/2012 | |

(Continued)

OTHER PUBLICATIONS

English Translation of DE102015113035, 2015 (Year: 2015).*
(Continued)

*Primary Examiner* — Abby Y Lin
*Assistant Examiner* — Renee LaRose
(74) *Attorney, Agent, or Firm* — Collard & Roe, P.C.

(57) ABSTRACT

A method for operating a self-propelled cleaning device, in particular a vacuuming and/or wiping robot, the cleaning device traveling in one or more rooms on the basis of a stored room map and, if necessary, carrying out cleaning jobs. The cleaning device furthermore receives information from a fire sensor, in particular initiates an emergency call in the event of a fire alarm. In order to devise a method which offers active help to individuals present in the rooms, the cleaning device, in the event of a fire alarm, outputs an acoustic and/or optical signal and moves toward an emergency exit or toward a safe location starting from its current location.

9 Claims, 6 Drawing Sheets

(51) Int. Cl.
    *G08B 3/10*     (2006.01)
    *G08B 5/36*     (2006.01)
    *G08B 7/06*     (2006.01)
    *G08B 17/10*     (2006.01)
    *G08B 21/22*     (2006.01)
    *G08B 25/00*     (2006.01)
    *H04N 7/18*     (2006.01)

(52) U.S. Cl.
    CPC ............... *G08B 5/36* (2013.01); *G08B 7/066* (2013.01); *G08B 17/10* (2013.01); *G08B 21/22* (2013.01); *G08B 25/008* (2013.01); *H04N 7/181* (2013.01); *A47L 2201/00* (2013.01); *G05D 2201/0215* (2013.01); *G05D 2201/0217* (2013.01)

(56) References Cited

U.S. PATENT DOCUMENTS

| | | |
|---|---|---|
| 2007/0296570 A1 | 12/2007 | Barrieau et al. |
| 2012/0221174 A1* | 8/2012 | Daly ................... G05D 1/0289 701/2 |
| 2014/0207280 A1 | 7/2014 | Duffley et al. |
| 2015/0145643 A1* | 5/2015 | Fadell ................. G06Q 10/083 340/5.51 |
| 2015/0170509 A1 | 6/2015 | Artes et al. |

FOREIGN PATENT DOCUMENTS

| | | | |
|---|---|---|---|
| EP | 2 617 341 A2 | | 7/2013 |
| JP | 2004038761 A | * | 2/2004 |
| JP | 2014-142742 A | | 8/2014 |
| WO | 2014/000009 A2 | | 1/2014 |

OTHER PUBLICATIONS

JP-2004038761-A—English trans (Year: 2004).*
International Search Report of PCT/EP2016/060367, dated Dec. 2, 2016.
Response to European Patent Office by German Patent Attorney dated Feb. 10, 2017 in PCT/EP2016/060367 with English translation of relevant parts of same.

* cited by examiner

METHOD FOR OPERATING A SELF-PROPELLED CLEANING DEVICE

CROSS REFERENCE TO RELATED APPLICATIONS

This application is the National Stage of PCT/EP2016/060367 filed on May 10, 2016, which claims priority under 35 U.S.C. § 119 of German Application No. 10 2015 107 598.9 filed on May 13, 2015, the disclosures of which are incorporated by reference. The international application under PCT article 21(2) was not published in English.

The invention relates to a method for operating a self-propelled cleaning device, in particular a vacuuming and/or wiping robot, the cleaning device traveling in one or more rooms on the basis of a stored room map and, if necessary, carrying out cleaning jobs, the cleaning device furthermore receiving information from a fire sensor.

Methods for operating such a cleaning device are well known in the prior art. The cleaning device, in particular the cleaning robot, travels back and forth within the apartment on the basis of a stored room map and carries out cleaning jobs based on a movement pattern. It is also known to equip such cleaning devices, which primarily serve for carrying out cleaning jobs, with further functions, such as herein, for example, the interaction with a fire sensor. The printed matter WO2014/000009 A2 discloses, for example, a method in which a self-propelled cleaning device is sent by a fire alarm system to a location of a fire to capture images or videos there and to make them available to emergency personnel. Moreover, the cleaning device is able to recognize persons in need by means of a sensor and tries to contact them in order to determine if they are conscious.

From US 2012/0221174 A1, a method for operating a self-propelled cleaning is known in which the cleaning device can travel in one or more rooms based on, for example, stored or received coordinates and can carry out cleaning jobs.therein. From US 2007/0296570A1, a fire alarm robot is known which can move to various places in a building based on its own sensors. When a condition is detected that implies a fire, the robot moves towards the place or the room at which this condition exists.

In the event of a fire, the mentioned methods can make additional information available to emergency personnel; however, they offer no to less assistance for persons present in the rooms.

The invention therefore has the object to provide a method which is able to offer active help to persons present in the rooms.

This object is solved in that in the event of a fire, the cleaning device outputs an acoustic or optical signal and, starting from its current location, moves towards an emergency exit or a safe location.

With the invention, a person present in the room is offered active help to leave the premises and not exclusively to have to wait passively for the arrival of the emergency personnel. The invention is based on the knowledge that in the event of a fire, it is in most cases not possible to orient oneself by means of the own eyesight since the smoke development is often so strong that a person present cannot see anything anymore. In this respect, the person can only orient himself/herself tactilely or by means of his/her hearing. According to the invention, the cleaning device now sends out an acoustic or optical signal which can be perceived by the person. An optical signal only serves for those cases, in which the person is in close proximity to the cleaning device. According to the invention, the person follows the acoustic and/or optical signal and thus also the moving cleaning device to an emergency exit or a safe location. The safe location can be for example, a fireproof room or a place in front of an open window. In addition, it can also be provided that the person may grab a cord, that preferably has a handle and that is secured on the cleaning device, and may follow the cleaning device, similar to a dog. Thus, the person can also use his/her tactile sense.

It is proposed that the cleaning device outputs a permanent or periodic signal. This enables the person to detect the presence of the cleaning device preferably at any point in time.

Particularly suitable is a permanent signal which clearly differs from environmental sounds in terms of volume or frequency or a tone sequence. To this end, for example, the cleaning device can also be designed such that it measures environmental sounds and selects the type and volume of the acoustic signal in dependence on the background noise. It is also possible to output a periodic signal, wherein the repetition frequency should be high enough that the person can keep in audible contact with the cleaning device at any time and safely finds the way to the emergency and a safe location, respectively.

It is proposed that the cleaning device receives a fire alarm from an external fire sensor disposed within a room, extrapolates the location of the fire in dependence on the location of the fire sensor and determines, based on the room map, a safest and/or shortest route to the emergency exit or the safe location. For this purpose, a room map which includes the locations of the fire sensors within the rooms is stored in a memory of the cleaning device. If now one of the fire sensors sends out a fire alarm, the cleaning device can immediately identify the location of the fire by means of the stored room map. In doing so, the location of the fire can be determined more accurately, the more fire sensors are disposed within the rooms. Furthermore, the location of the emergency exit as well as further information about the locations of doors and windows are stored in the room map. Moreover, the cleaning device also knows, of course, its own location. Based on this information, a computing unit of the cleaning device calculates the safest and/or shortest route from the current location of the cleaning device to the emergency exit and a safe location, respectively. Depending on the situation, the route may prefer either the route to the emergency exit or the route to a safe location, depending on whether one of the ways is blocked or is substantially shorter than the other one. In addition, if applicable, the current location of the person present has to be considered, if this location differs substantially from the location of the cleaning device. In this case, the cleaning device has first to approach the waiting person to subsequently accompany the person to the emergency exit and the safe location, respectively. In this context it is also possible, of course, that the cleaning device has its own fire sensor, wherein the cleaning device may first carry out an exploratory travel in order to find out the exact location of the fire before the cleaning device then takes the person to the emergency exit or the safe location.

Advantageously, the cleaning device detects a person present in the room and calls upon the same by means of voice output to follow to the emergency exit or the safe location. Thus, in the event of a fire, the cleaning device does not travel immediately towards the emergency exit and the safe location, respectively, but checks first, if the person is situated within the rooms. In order to inform the person present about the presence of the cleaning device, the cleaning device sends out a voice message which, for example, contains a request to follow the cleaning device to the emergency exit or the safe location. The person present thus has the possibility to follow the cleaning device even if this person is not informed about the presence and operating principle of the cleaning device. Optionally, further information can be transmitted to the person, such as, for example, how far away the respective emergency exit and/or the safe location is, in which room the fire has broken out and how many further persons, if any, are situated in the rooms.

Furthermore, it is recommended that the cleaning device measures by means of a detection system, in particular an acoustic sensor or ultrasonic sensor, if the person follows the cleaning device to the emergency exit and the safe location, respectively. Thus, the speed of the cleaning device can be adapted according to how fast the person follows the cleaning device. If, for example, the person is very insecure, the cleaning device can travel at very low speed or can take breaks. Where applicable, it can be required to repeat the request to follow to the emergency exit and the safe location, respectively, since it is possible that the person follows the cleaning device only by chance but has not understood a previous voice output. It is recommended that the detection system also works in smoke-laden rooms. Thus, particularly suited is an acoustic sensor which detects noises made by the person, or an ultrasonic sensor, the latter being preferred due to the frequently existing loud background noise.

In addition or as an alternative to the aforementioned method, in which a person is guided to an emergency exit and a safe location, respectively, the method can perform further complementary objects. In this sense it is proposed, for example, that the cleaning device receives information from the burglar. alarm system, in addition to the usual cleaning jobs, and outputs an alarm in the event of a burglary, the cleaning device outputting, as an alarm, a signal containing a human voice by means of a voice output of a recorded conversation, or asequence of barking of dogs stored in a memory.

According to the invention, the cleaning device thus can be used in combination with a burglar alarm system disposed in the rooms. The burglar alarm system can either be a burglar alarm system stationarily installed within the rooms, or, as an alternative, the cleaning device itself can also be equipped with a motion sensor or the like, based on the signal of which a burglary can be concluded. Meant in the sense of a burglar alarm system are, for example, magnetic contacts on windows and doors, light curtains, seismic detectors, motion sensors or the like. In the case of a detected burglary, the cleaning device simulates, according to the invention, the presence of a person within the monitored rooms to deter a potential burglar and to make him giving up the attempted burglary. In this sense, the cleaning device carries out a cleaning job as an alarm; for example, the cleaning device may travel self-propelled within a room and vacuum the floor at the same. In particular, if the cleaning device in the process of this is situated in an adjacent room, so that the burglar has no view on the cleaning device, this measure can be helpful. Furthermore, the cleaning device can play a recorded conversation or barking of dogs as a voice output, which indicates the presence of a dog. Overall, further measures would also be conceivable such as, for example, the remote-controlled turning on of a ceiling lighting, a television set or the like.

Moreover, it can be provided that the burglar alarm system detects the presence of a person within a room, the burglar alarm system or the cleaning device identifying the person present based on data saved in a memory. This function is intended for the case that a known, authorized person moves within the rooms. The presence of an authorized person shall not result in an alarm. Insofar, data stored in a memory can be, for example, a photo of a person, the voice of the person, a personal code of the person or the like. For example, it is possible that the person is asked by the cleaning device to enter a code for turning off the alarm via a touch pad or the like. Moreover, it is particularly advantageous if a mobile device, which a person carries along anyway, such as, for example, a mobile phone, sends a code to the cleaning device and thus identifies the person.

Furthermore, it is proposed that the cleaning device accesses a calender program of an external devices, in particular a personal computer or a mobile phone, the presence of the person being compared with an actual calender entry. This function is meant, for example, as an additional security check to check whether the identified person is the person present. A calender entry can provide, for example, the information that the person is absent for a prolonged period at the time of the alarm and that therefor there is only a low probability that the person stays in the rooms. On the other hand, in periods in which there are no calender entries and it can therefore be assumed that one or more persons regularly stay in the rooms, the alarm can be switched off so that no false alarm can occur. Moreover, the alarm function, however, is also suited for detecting a return of a person expected according to the calender, for example a return of children from the school. In this sense it is proposed with the invention that information about the presence of the person is transmitted to an external device, in particular a mobile phone. For example, the arrival of the children after school can be reported to a mobile phone of a parent so that the parent receives the information that the children arrived safely at home.

In the sense of the achievement according to the invention of further objects, besides the actual cleaning job, by a self-propelled cleaning device, furthermore, a method is proposed in which the cleaning device accesses a calender program and uses information contained in the calender program for scheduling cleaning jobs, the cleaning device accessing a calender program of an external device via an external communication interface, the cleaning device extrapolating from the information contained in the calender program the absence of persons in one or more rooms at a certain time and accordingly carrying out a cleaning in there.

According to the invention, the cleaning devices not only accesses a cleaning device memory of its own but rather accesses a calender of an external device. In contrast to an internal calender of the cleaning device, which regularly only includes a cleaning plan broken down according to days and hours, the external calender is a usual virtual calender in which, advantageously, a plurality of persons also enter their dates simultaneously. With the aid of an evaluation and control unit, the cleaning device evaluates the entries and subsequently calculates time periods during which certain persons are not present and thus their personal rooms can be cleaned.

Moreover, it is proposed that the cleaning device receives signals from one or more room surveillance systems via the communication interface, the room surveillance systems detecting in particular a motion signal within a room, a current consumption within a room and/or an actuation of an electric switch within a room, a cleaning being stopped or interrupted when the cleaning device receives a signal from the room surveillance system which implies the present of a person. According to the invention it is also possible to additionally include data of room surveillance systems for determining the presence of a person. Hereby, data of motion sensors, cameras, electricity meters, light switches and the like can be used to control the cleaning activities so that determining the presence of a person does not depend exclusively on the calender entries. Rather, a possible cleaning program that has just been carried out can be changed as soon as it is detected that a person enters the room and turns on the light or the like.

Finally, the invention proposes one of the aforementioned methods in which the cleaning device is integrated in a data communication network, in particular a network of a home automation system, the cleaning device receiving information from a network device integrated in the data communication network, in particular a fire sensor, a burglar alarm system and/or an external device including a calender program, and/or transmitting information to a network device integrated in the data communication network, the behavior of the cleaning device and/or of the network device being controlled in dependence of the transmitted information. In doing so, the cleaning device is connected with a plurality of other network devices within a common data communication network. Advantageously, the data communication network can be the network of a house automation system, the Internet or also another network. Thereby, networking all electrical devices in a house automation system becomes possible, whereby versatile control possibilities are provided to the a user. Besides traditional elements, such as light switches, power outlets, drives for shutters and awnings, the house automation system may also comprise diverse sensors, such as, for example, fire, smoke, glass breakage or motion sensors so that more or less complex control or regulating objects can be automated. Moreover, entertainment electronics devices and/or household appliances can also be included. Wireless networks and/or connections to IT and communication networks are also conceivable. In this sense, television sets, computers, mobile phones stereo systems, kitchen appliances or the like can also be included in the house automation system. Through the data connection, in particular bidirectional communication connection, of the cleaning device with the one or more further network devices, the information, i.e. data, of the cleaning device can be made mutually available so as to carry out certain functions in dependence thereon. For example, a motion sensor of a burglar alarm system may detect the presence of the cleaning device and thereupon omit an alarm. For this purpose, the burglar alarm system transmits a request for identification to the cleaning device, which then sends an identification code back to the burglar alarm system, which identification code is compared with a stored reference code and identifies the cleaning device in the event of a match. A plurality of interactions between the cleaning device and other network devices of the data communication network is possible, wherein in each case two or more devices can communicate with one another simultaneously or in chronological sequence.

Hereinafter, the invention is explained in more detail by means of exemplary embodiments. In the figures.

Figure 1:
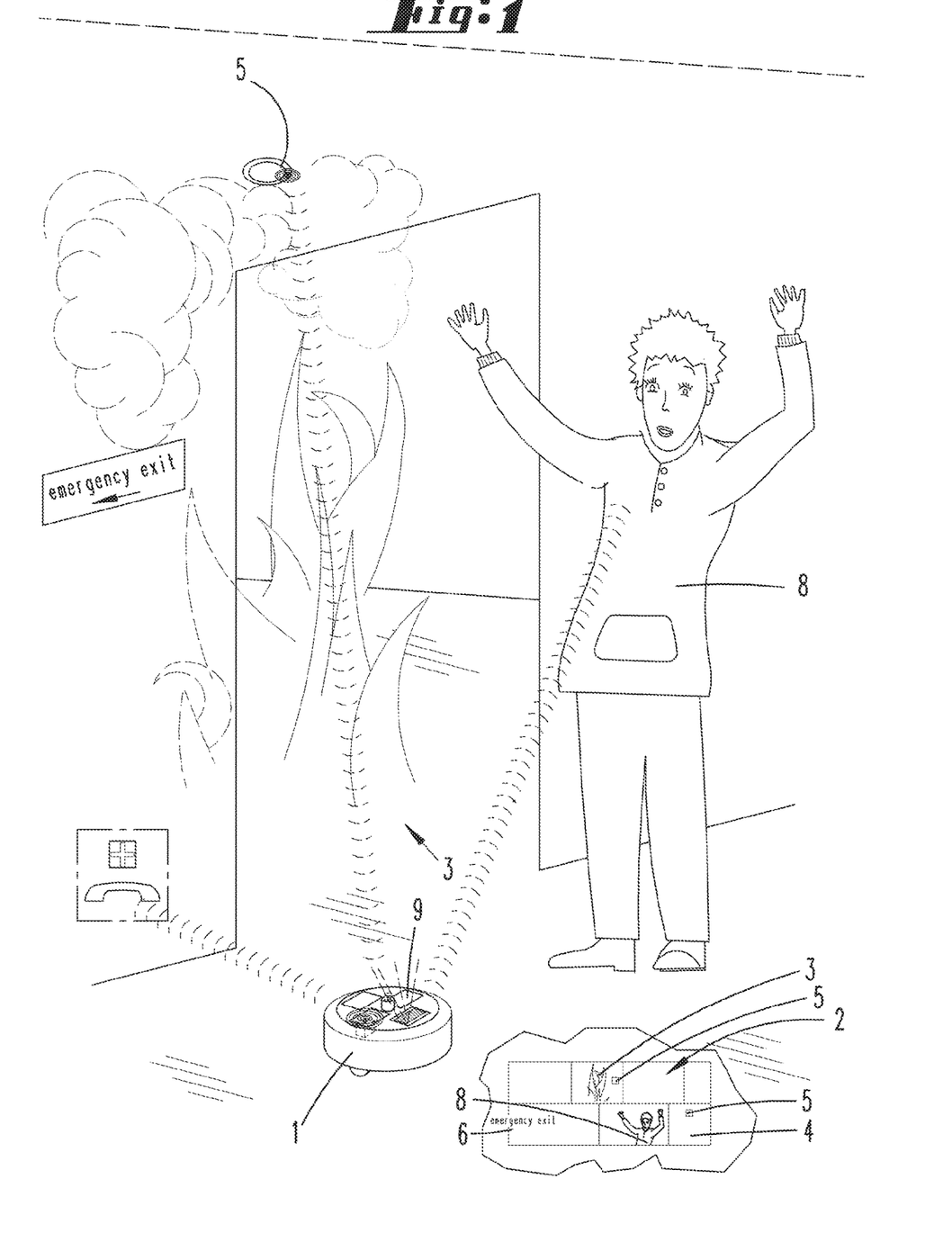
FIG. 1 shows a method according to the invention according to a first embodiment variant during a first method step.

With reference to the FIGS. 1 to 3 it is explained below how a self-propelled cleaning device 1 is utilized to provide assistance to a person 8 present in a room 4 during a fire in order to reach an emergency exit 6.

The cleaning device 1 is a self-propelled cleaning robot which can perform vacuuming and/or wiping jobs in a usual manner. The cleaning robot 1 has a memory in which, among other things, a room map 2 is stored, which contains the location and optionally also spatial division, furnishing or the like of one or more rooms 3, 4. In addition, the locations of one or more fire sensors 5 as well as the location of an emergency exit 6 or the location of windows and doors are also listed in the room map 2. Moreover, further location information which can be helpful in case of an emergency can also be stored such as, for example, the location of a telephone, of a first aid kit or the like. The cleaning robot 1, the one or the plurality of fire sensors 5 and optionally further network devices are integrated in a common data communication network so that information can be mutually exchanged.

During usual operation, the cleaning device 1 travels around automatically in one or more rooms 3, 4 and vacuums therein dirt from a floor to be cleaned. In the event that a fire sensor 5 installed within a room 3, 4 detects a fire, the cleaning device 1 receives from this fire sensor 5 information about the fire. Simultaneously with the information about the fire, the fire sensor 5 transmits an identification that can be associated with the same so that the cleaning device 1 simultaneously receives information regarding which of the fire sensors 5 reports a fire. Thereupon, the cleaning device 1 enters a local indication in the room map 2 that in the room 3, 4 in which the fire sensor 5 is located, a fire has broken out. Optionally, a more detailed information on where precisely the fire is located is available by means of a surveillance camera within the rooms 3, 4.

Thereupon, the cleaning device 1 transmits information about the fire to a fire emergency center. For this purpose, the cleaning device has a radio module. If necessary, further information, for example the stored room map 2 with the information contained therein about the location of the triggering fire sensor 5, the location of an emergency exit or the like can be transmitted to the fire emergency center together with the emergency call. Moreover, the cleaning device 1 has a detection system 9, for example an ultrasonic sensor, which enables detection of persons 8 present within the rooms 3, 4. The information about person present, in turn, can be transmitted to the fire emergency center. Likewise, this information is also entered in the room map 2. Thus, the situation detected by the cleaning device 1 is captured completely in the room map 2 so that thereupon, the cleaning device 1 can calculate a suitable operating strategy.

Figure 2:
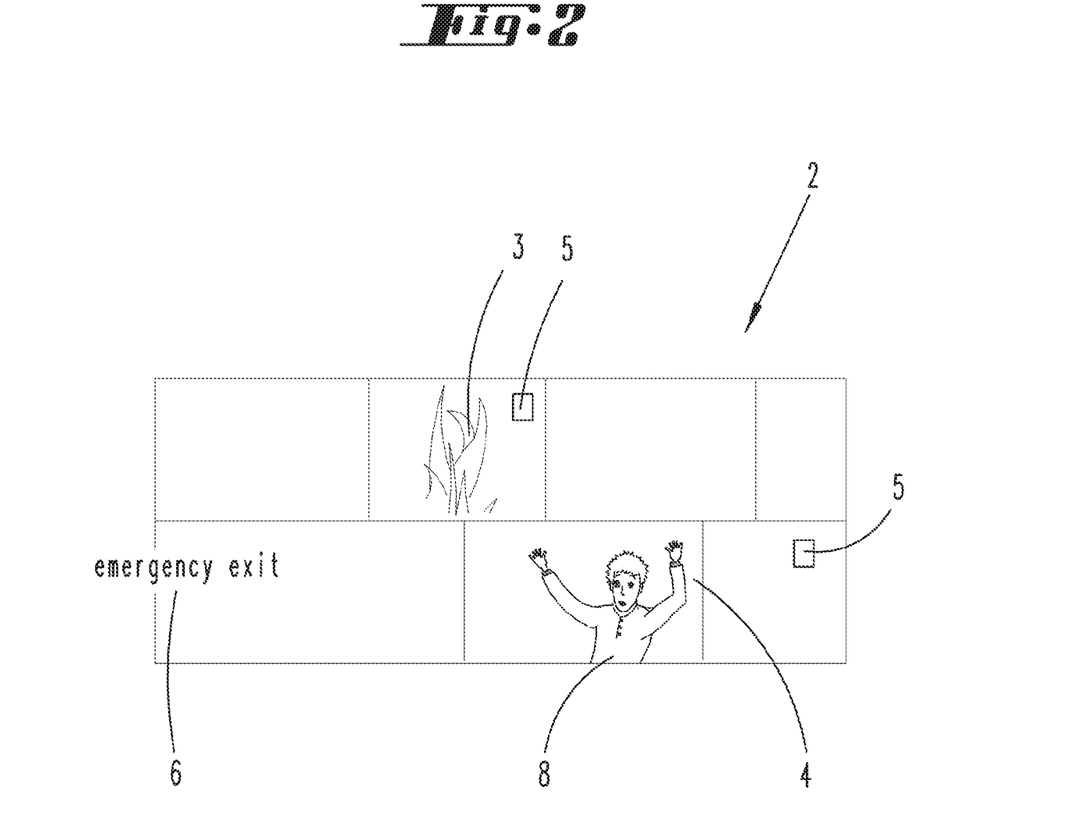
FIG. 2 shows a stored room map.

FIG. 2 shows a detailed illustration of the room map 2. The latter comprises a layout of an apartment with a plurality of rooms 3, 4. As in a typical layout, doors and windows which connect the rooms to one another and lead to the outside air, respectively, are plotted. For example, the room 3, which includes the reporting fire sensor 5, is linked to a fire information. Moreover, the current location of a person 8 in the room 4 is indicated. The location of the closest emergency exit 6 is also plotted in the layout. Moreover, as previously mentioned, a plurality of further information can be stored, which is not graphically illustrated.

Figure 3:
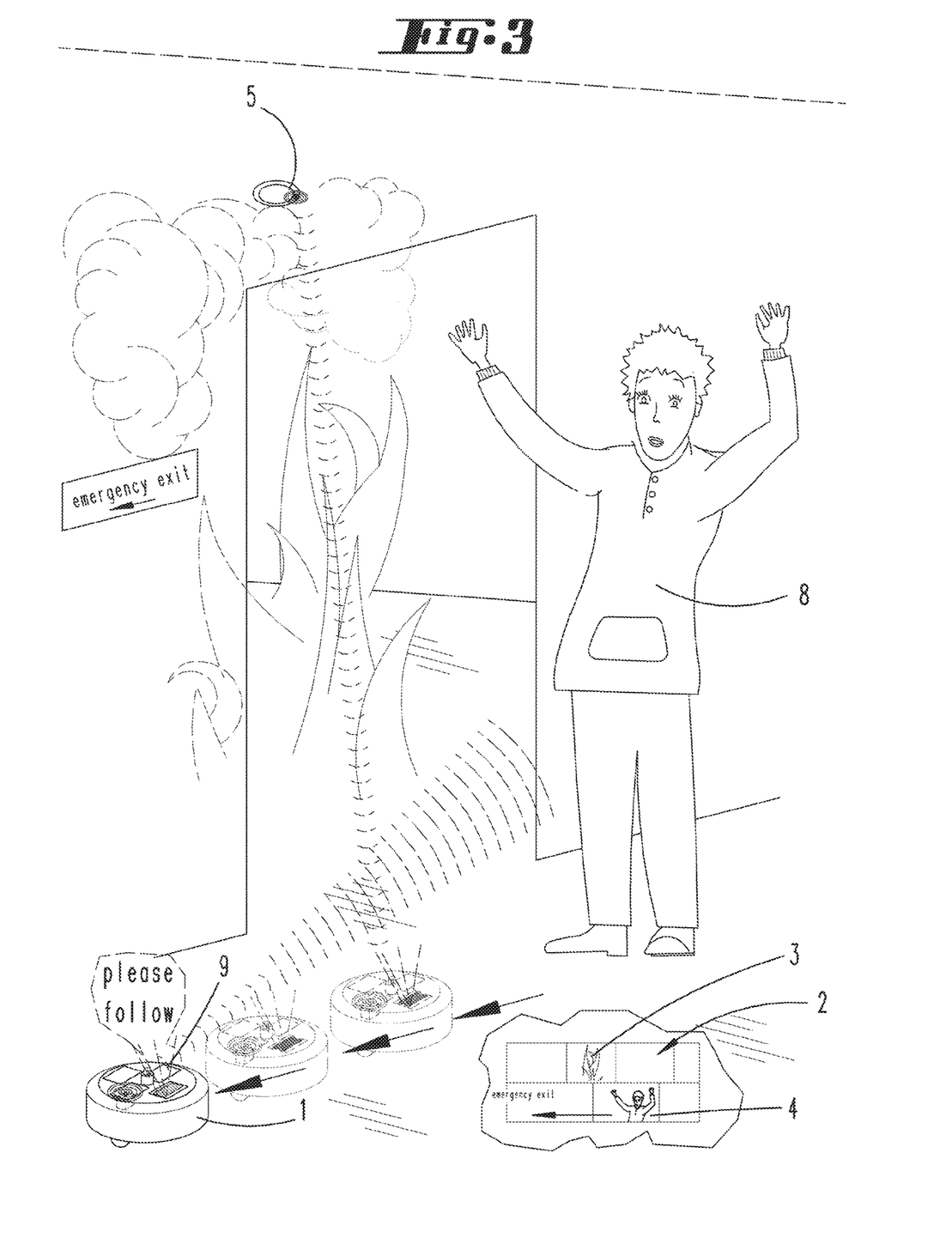
FIG. 3 shows the method during a later method step.

As illustrated in FIG. 3, the cleaning device 2 determines from the information entered in the room map 2 a shortest and/or safest way from the location of the person 8 in the room 4 to the emergency exit 6. In order to now be able to guide the person 8 present to the emergency exit 6, it is required to notify the person 8 about the presence of the cleaning device 1 and the available guiding function of the cleaning device 1. In practice, a fire results in such a large amount of smoke that the person 6 is no longer able to visually orient himself/herself in the rooms 3, 4 and often no longer recognizes objects, even if they are located in close proximity. Therefore, the cleaning device first sends information with the content that the cleaning device 1 intends to guide the person 8 to the emergency exit 6 to the person by means of voice output. If necessary, the voice output can also be supported by an optical signal, for example a blinking light, which can still be recognized, at least from shorter distances. Thus, the person 8 obtains information about the presence of the cleaning device 1 and the possibility to follow the cleaning device 1 to the emergency exit 6. If necessary, the cleaning device 1 may then also communicate by means of voice output when it will start moving. For example, it is possible that the cleaning device 1 counts from 10 down to 1 so that the person 8 is given the possibility to prepare for following. Thereupon, the cleaning device 1 sends out a permanent signal which is clearly distinguished from the background noises in terms of either volume level or tone sequence. For this purpose, the cleaning device 1 may comprise a detection system for background noises which is able to evaluate the background noises and thereafter to adapt the type and volume level of the cleaning device's 1 own signal output. While the cleaning device 1 moves towards the emergency exit 6, it checks at regular intervals if the person 8 follows the cleaning device 1. Where appropriate it is necessary to repeat the voice output with the note "Follow, please" if the person 8 appears to be without orientation. The voice output may also be updated such that current information can be output to the person 8, such as, for example, the indication which distance to the emergency is still to be covered, or the like. Moreover, the cleaning device 1 may also have a bidirectional communication device by means of which a voice input of the person 8 can be processed. For example, the person 8 can actively react to the cleaning device 1 and indicate that he/she wants to follow the cleaning device 1 to the emergency exit 6. Furthermore, the cleaning device 1 also has a communication interface through which it is possible for the person 8 to transmit information to emergency personnel, such as, for example, information about his/her own state of health, the presence of further persons 8 or the like.

Although the cleaning device 1 in the illustrated exemplary embodiment calculates a route to the emergency exit 6, it is also possible that a route to a safe location other than the emergency 6 is calculated. The safe location can be, for example, a place at a window, a fire protection room or the like. However, the operating principle of the method remains unaffected thereby.

Figure 4:
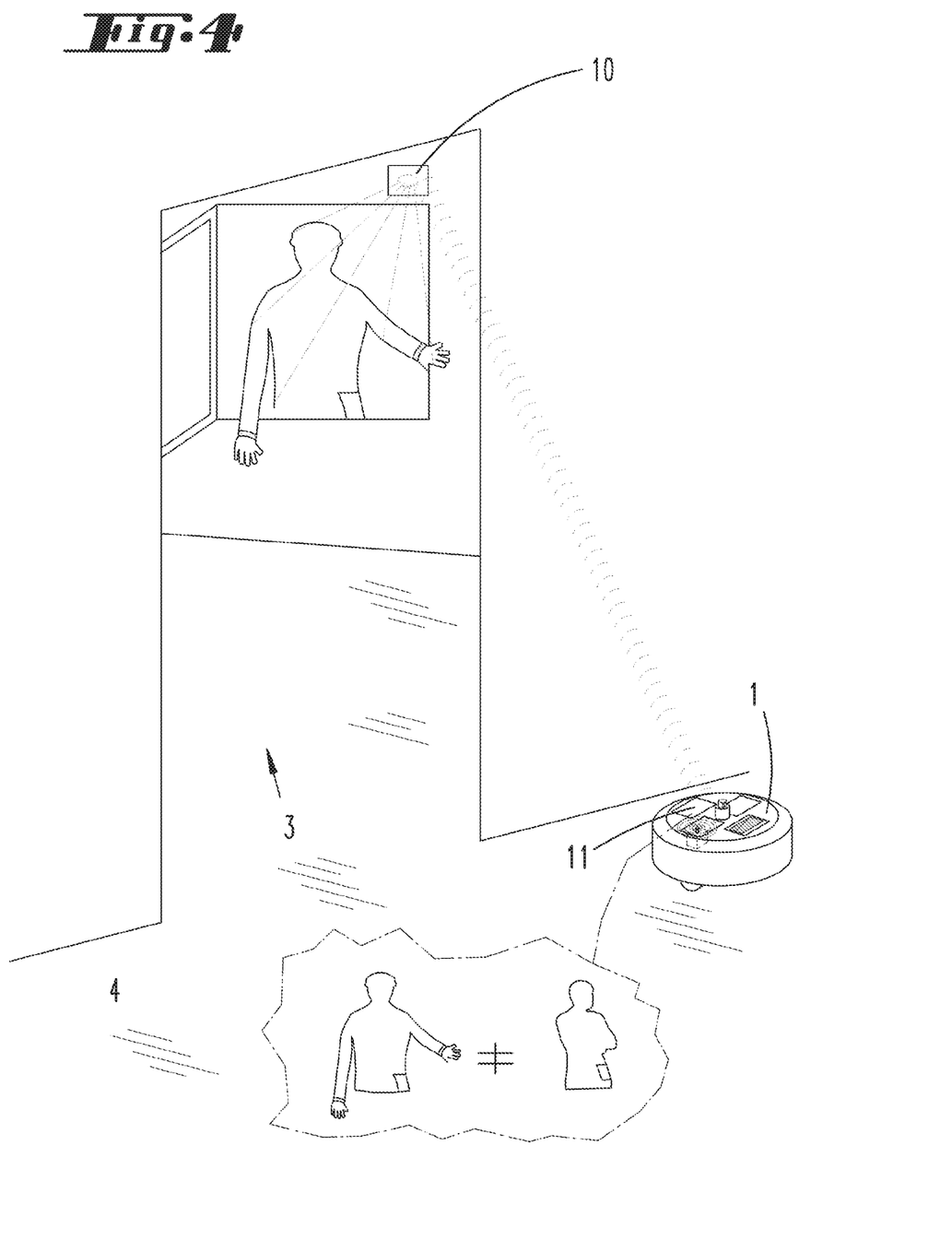
FIG. 4 shows a method according to the invention according to a second embodiment variant during a first method step.
Figure 5:
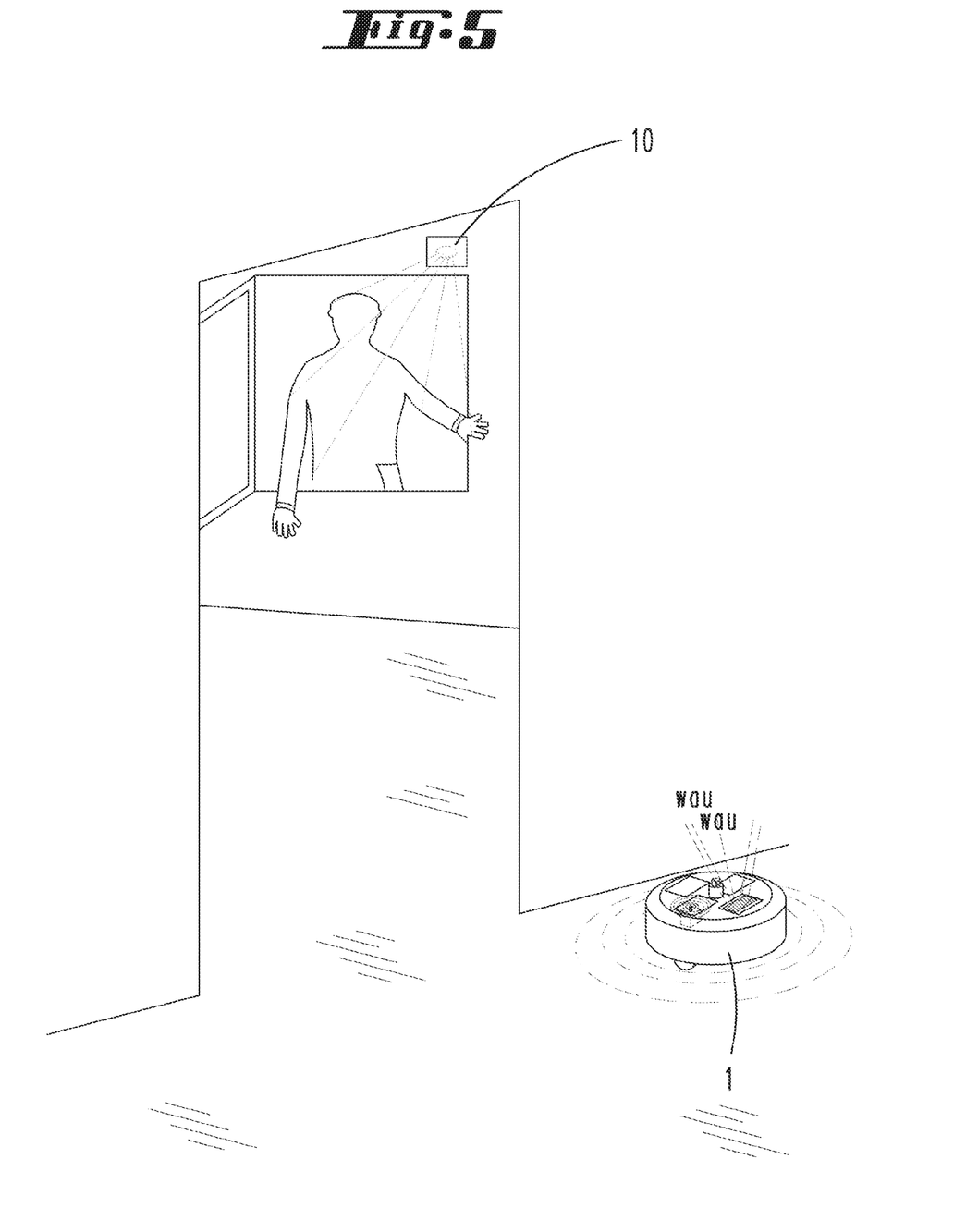
FIG. 5 shows the method during a later method step.

FIGS. 4 and 5 show a second embodiment variant of a method according to the invention which serves for deterrence of burglars.

For carrying out the method, a burglar alarm system 10 disposed in one or a plurality of rooms 3, 4 communicates with the cleaning device 1. Here, the burglar alarm system 10 has, for example, a motion detector which is disposed above a window. As soon as the burglar alarm system 10 detects a movement in the monitored area, it reports an advantageously mute alarm to the cleaning device 1. If necessary, the burglar alarm system 10 may transmit further information to the cleaning device 1, such as, for example, a photograph of a camera connected to the burglar alarm system 10. This information is compared with data about known persons 8 stored in a memory 11 of the cleaning device 1 and thereupon the alarm strategy is adapted. If, as in the exemplary embodiment shown, the cleaning device 1 comes to the conclusion that the burglar is not a known person about whom data are stored in the memory 11, the cleaning device 1 outputs an alarm which, on the one hand, contains a voice output which is a sequence of barking of dogs stored in the memory 11. On the other hand, by carrying out a usual cleaning job, for example carrying out a vacuum-cleaning process, the cleaning device 1 simulates the presence of a person 8 so that the burglar has the impression that a person is in a non-visible room, which person is currently vacuum-cleaning. Due to this background noise, the burglar obtains the information that a person 8 as well as a dog is present in the rooms 3, 4 so that burglary does not seem to make any sense.

Figure 6:
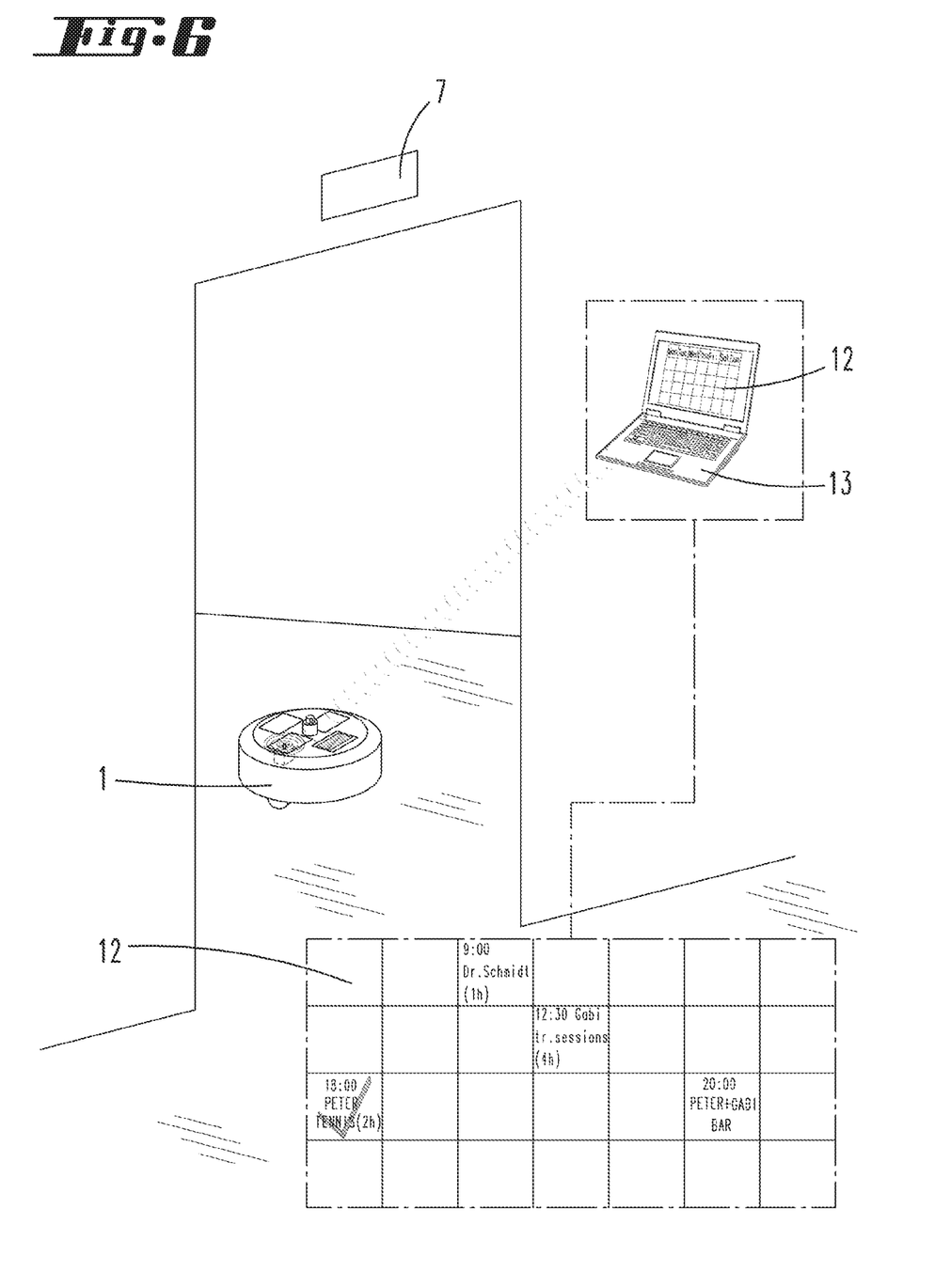
FIG. 6 shows a method according to the invention according to a third embodiment variant.

Lastly, FIG. 6 shows a third embodiment variant of the method according to the invention in which the cleaning strategy of the cleaning device 1 is calculated in dependence on a calender program 12 stored on an external device 13.

For this purpose, the cleaning device 1 communicates by means of an external communication interface with an external device 13, which is a laptop here. A calender program 12, which contains dates of one or more persons 8 in the household, is installed on the external device 13. As usual, the calender program 12 is broken down in week days and times of day, wherein different dates such as school lessons, training sessions, appointments or the like can be entered. At an arbitrary point in time, the cleaning device 1 checks the dates entered in the calender program 12 and calculates which persons 8 can be present at this point in time in the rooms 3, 4 and are not present due to dates, respectively. Thereafter, the cleaning devices 1 determines a cleaning strategy which, for example, considers cleaning first in those rooms 3, 4 in which the respective persons 8 are absent only for a short time. In addition, as far as communication is concerned, the cleaning device 1 is connected to a room surveillance system 7, which room surveillance system 7 is disposed above the apartment door, for example. In case a person 8 enters the apartment, the cleaning strategy of the cleaning device 1 can be adapted. Advantageously, the room surveillance system 7 is coupled to a person recognition system which recognizes, optically or based on a code, a person 8 entering the rooms 3, 4 and thereupon excludes those rooms 3, 4 from cleaning which are likely to be used by that person 8. Rooms 3, 4 which usually are not accessed by this person 8 can continue to be cleaned.

REFERENCE LIST 1 cleaning device
2 room map
3 room
4 room
5 fire sensor
6 emergency exit
7 room surveillance system
8 person
9 detection system
10 burglar alarm system
11 memory
12 calender program
13 external device

The invention claimed is:

1. A method for operating a self-propelled cleaning device (1), comprising the following steps:
   traveling with the cleaning device (1) in one or more rooms (3, 4) on the basis of a stored room map (2)
   carrying out cleaning jobs therein with the cleaning device,
   receiving information in the cleaning device from a fire sensor (5),
   initiating an emergency call in the event of a fire alarm,
   outputting via the cleaning device an acoustic and/or optical signal and starting from its current location, moving the cleaning device towards an emergency exit (6) or a safe location,
   wherein the cleaning device receives a fire alarm from an external fire sensor disposed separate to the cleaning device within a room, extrapolates the location of the fire in dependence on the location of the fire sensor and determines, based on the room map, a safest route to the emergency exit or the safe location by avoiding the location of the fire.

2. The method according to claim 1, wherein the cleaning device (1) outputs a permanent or periodic signal.

3. The method according to claim 1, wherein the cleaning device (1) detects a person (8) present in the room (3, 4) and requests the person by means of a voice output to follow to the emergency exit (6) and the safe location, respectively.

4. The method according to claim 3, wherein the cleaning device (1) measures by means of a detection system (9) whether the person (8) follows the cleaning device (1) to the emergency exit (6) and the safe location, respectively.

5. A method for operating a self-propelled cleaning device (1), comprising the following steps:
   traveling with the cleaning device (1) in one or more rooms (3, 4) on the basis of a stored room map (2),
   carrying out cleaning jobs therein,
   receiving with the cleaning device (1) information from a stationary burglar alarm system (10) installed within the room, and
   outputting an alarm in the event of a burglary,
   wherein the cleaning device (1) carries out a cleaning job as the alarm, wherein the cleaning job is carried out as the alarm in a room that is not visible from a location of the burglar alarm, to give a burglar an impression that a person is located in the non-visible room.

6. A method for operating a self-propelled cleaning device (1) comprising the following steps:
   traveling with the cleaning device (1) in one or more rooms (3, 4) on the basis of a stored room map (2),
   carrying out cleaning jobs therein,
   receiving with the cleaning device (1) information from a stationary burglar alarm system (10) installed within the rooms, and
   outputting an alarm in the event of a burglary,
   wherein the cleaning device (1) outputs, as the alarm, a signal containing human voice by means of a voice output of a recorded conversation, or a sequence of barking of dogs stored in a memory, wherein the cleaning device outputs the signal in a room that is not visible from a location of the stationary alarm system, to give a burglar an impression that a person or a dog is in the non-visible room.

7. The method according to claim 5, wherein the burglar alarm system (10) detects a presence of a person (8) within a room (3, 4), the burglar alarm system (10) or the cleaning device (1) identifying the person (8) present based on data stored in a memory (11).

8. The method according to claim 7, wherein the cleaning device (1) accesses a calendar program (12) of an external device (13), the presence of the person (8) being compared with a current calendar entry.

9. The method according to claim 8, wherein information about the presence of the person (8) is transmitted to an external device (14).

* * * * *